United States Patent
Kim et al.

(10) Patent No.: US 9,279,892 B2
(45) Date of Patent: Mar. 8, 2016

(54) SYSTEMS AND METHODS FOR SCINTILLATORS HAVING POLISHED AND ROUGHENED SURFACES

(71) Applicant: General Electric Company, Schenectady, NY (US)

(72) Inventors: Chang Lyong Kim, Brookfield, WI (US); David Leo McDaniel, Dousman, WI (US); Mikiko Ito, Waukesha, WI (US)

(73) Assignee: General Electric Company, Schenectady, NY (US)

(*) Notice: Subject to any disclaimer, the term of this patent is extended or adjusted under 35 U.S.C. 154(b) by 70 days.

(21) Appl. No.: 14/173,569

(22) Filed: Feb. 5, 2014

(65) Prior Publication Data

US 2015/0219771 A1    Aug. 6, 2015

(51) Int. Cl.
- *G01T 1/20* (2006.01)
- *G01T 1/202* (2006.01)
- *G02B 6/24* (2006.01)

(52) U.S. Cl.
CPC . *G01T 1/202* (2013.01); *G02B 6/24* (2013.01); *Y10T 29/49826* (2015.01)

(58) Field of Classification Search
CPC ....................................... G01T 1/202
See application file for complete search history.

(56) References Cited

U.S. PATENT DOCUMENTS

| | | | |
|---|---|---|---|
| 4,733,083 A | 3/1988 | Wong | |
| 4,743,764 A | 5/1988 | Casey et al. | |
| 4,749,863 A | 6/1988 | Casey et al. | |
| 5,091,650 A * | 2/1992 | Uchida et al. | 250/366 |
| 5,210,420 A | 5/1993 | Hartz et al. | |
| 5,227,634 A | 7/1993 | Ryuo et al. | |
| 5,300,782 A | 4/1994 | Johnston et al. | |
| 6,087,663 A | 7/2000 | Moisan et al. | |
| 7,088,901 B2 | 8/2006 | Kim et al. | |
| 9,012,854 B2 * | 4/2015 | Wieczorek et al. | 250/362 |
| 2014/0084170 A1 * | 3/2014 | Wieczorek et al. | 250/362 |

\* cited by examiner

*Primary Examiner* — David Porta
*Assistant Examiner* — Edwin Gunberg
(74) *Attorney, Agent, or Firm* — Dean D. Small; The Small Patent Law Group, LLC

(57) ABSTRACT

A scintillator crystal array that is configured to receive rays emitted by an object to be imaged and to emit light energy responsive to the received rays includes plural crystals. At least one of the crystals includes an upper surface, a lower surface, and plural sides. The upper surface may be configured to receive the rays from the object to be imaged. The lower surface is disposed opposite the upper surface. The plural sides extend between the upper surface and the lower surface. At least one side includes a roughened side surface and at least one other side includes a polished side surface.

13 Claims, 6 Drawing Sheets

SYSTEMS AND METHODS FOR SCINTILLATORS HAVING POLISHED AND ROUGHENED SURFACES

BACKGROUND OF THE INVENTION

The subject matter disclosed herein relates generally to imaging systems and techniques, and more particularly to crystals used in scintillators.

In certain types of imaging devices, such as positron emission tomography (PET) scanners, arrays of detector elements are used to detect radiation emanating from the patient. In a PET scanner, for example, arrays of scintillator crystals may be used to detect annihilation photons which are generated inside the patient. The annihilation photons are produced when a positron emitted from a radiopharmaceutical injected into the patient collides with an electron causing an annihilation event. The scintillator crystals receive the annihilation photons and generate photons in response to the annihilation photons, with the photons emitted to a photosensor configured to convert the light energy from the photons to electrical energy used to reconstruct an image.

Timing resolution of a time of flight (TOF) PET detector may depend on a number of components, including scintillation crystals and photosensors, and how the scintillation crystals and photosensors are combined into a detector along with readout electronics. Factors relating to the combination of the scintillation crystals and photosensors that may affect timing resolution include, for example, the light sharing scheme among the crystals and photosensors, the layout of photosensors, transit time spread between the photosensors, signal trace layout on amplifier board, and electronics noise, for example.

Because of the high speeds of photons (e.g., the speed of light) and relatively short distances traveled by the photons during imaging, the timing resolution of detectors is critical to imaging. This is even more so as demands for higher resolution increase.

BRIEF DESCRIPTION OF THE INVENTION

In accordance with various embodiments, a scintillator crystal array that is configured to receive rays emitted from an object to be imaged and to emit light energy responsive to the received rays is provided. The scintillator crystal array includes plural crystals. At least one of the crystals includes an upper surface, a lower surface, and plural sides. The lower surface is disposed opposite the upper surface. The plural sides extend between the upper surface and the lower surface. At least one side includes a roughened side surface and at least one other side including a polished side surface is provided.

In accordance with various embodiments, a detector system for imaging an object is provided including a scintillator block and a photosensor. The scintillator is configured to receive rays from an object to be imaged and to emit light energy responsive to the received rays. The scintillator block includes a scintillator crystal array configured to receive rays emitted by the object and to emit light energy responsive to the received rays. The scintillator crystal array includes plural crystals. At least one of the crystals includes an upper surface, a lower surface, and plural sides. The lower surface is disposed opposite the upper surface. The plural sides extend between the upper surface and the lower surface, wherein at least one side includes a roughened side surface and at least one other side includes a polished side surface. The photosensor is configured to receive the light energy emitted from the scintillator crystal array.

In accordance with various embodiments, a method for providing a scintillator for imaging an object is provided. The method includes providing at least one crystal that includes an upper surface, a lower surface, and plural sides. The lower surface is disposed opposite the upper surface. The plural sides extend between the upper surface and the lower surface. At least one side includes a roughened side surface and at least one other side includes a polished side surface. The method also includes assembling the at least one crystal with plural additional crystals to form a scintillator crystal array. Further, the method includes providing a reflector disposed around the sides of the scintillator crystal array, the reflector disposed around the sides of the crystal array and configured to reflect light directed from the sides of the scintillator crystal array back into the scintillator crystal array.

DETAILED DESCRIPTION OF THE INVENTION

Figure 1:
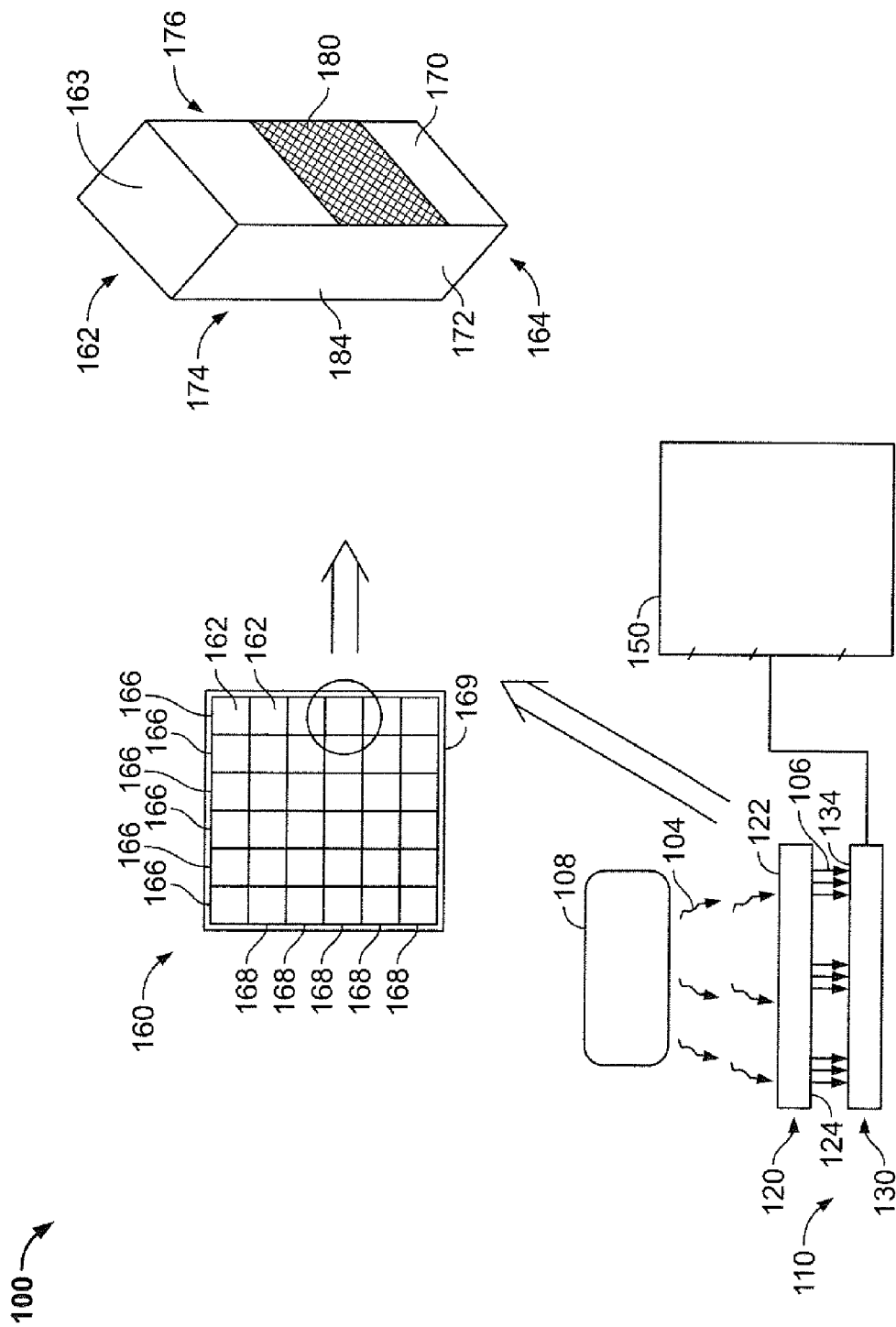
FIG. 1 is a schematic diagram of an imaging system in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively or additionally, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described herein. Additionally or alternatively, one or more of these devices may be hard-wired with logic circuits to perform these operations. Further, "systems," "units," or "modules" may be configured to execute one or more algorithms to perform functions or operations described herein. The one or more algorithms may include aspects of embodiments disclosed herein, whether or not expressly identified in a flowchart or as a step of a method.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide crystal arrays for scintillators for imaging systems, where at least some of the crystals include a side having a surface finish that is different from a surface finish of at least one other side. For example, one side (or a portion thereof) of a crystal may have a roughened surface, while one or more of the other sides may have a polished surface. For example, in various embodiments, the crystals of an array may have one roughened side and three polished sides each. Testing of various example arrays indicated that, for the arrays tested, including one roughened side (and three polished sides) improved timing performance, but including two roughened sides did not provide the same improvement in timing resolution. Accordingly, in various embodiments (depending, for example on crystal size, number of crystals in area, crystal material, or the like), the number of sides provided with a given finish as well as the proportion of one or more sides provided with a given finish may be varied to provide optimal or improved light spreading or transfer within the array.

A technical effect of at least some embodiments provides improved detector performance. For example, a technical effect of at least some embodiments includes improved light output of a scintillator crystal array. As another example, a technical effect of at least some embodiments provides improved timing resolution of a scintillator crystal array.

FIG. 1 provides a schematic diagram of an imaging system 100 in accordance with various embodiments. The imaging system 100 includes a detector 110 and a processing unit 150.

The detector 110 includes a scintillator block 120 and a photosensor 130. In the illustrated embodiment, the scintillator block 120 and the photosensor 130 form a positron emission tomography (PET) detector. However, in other embodiments, the scintillator block 120 and the photosensor 130 may additionally or alternatively be used with one or more other imaging modalities, such as single-photon emission computed tomography (SPECT), for example. It may be noted that one or more the various components or units of FIG. 1, although depicted as physically separate units or components, may in various embodiments be configured as more than one component or unit and/or be combined with another component or unit. For example, the photosensor 130 and one or more aspects of the processing unit 150 may be configured as a single unit.

Generally, in the illustrated embodiment, the imaging system 100 may be used to provide an image (e.g., a PET image) of the object 108. The object 108, for example, may be a portion of a human or animal patient. In the illustrated embodiment, the object 108 emits annihilation photons 104 due to the introduction of a radiopharmaceutical. The annihilation photons 104 are sensed by the detector 110 and used to reconstruct an image. The emitted ray may be a gamma ray produced by a transition in the nucleus of an atom. scintillator block 120

The depicted scintillator block 120 produces light photons 106 responsive to the impact of annihilation photons 104 upon the scintillator. The light photons 106 from the scintillator block 120 impact the photosensor 130. The photosensor 130 is configured to produce electric charge responsive to the impingement of light photons 106 from the scintillator upon a light reception surface 134 of the photosensor 130. The electric charge generated responsive to the reception of light may be measured (e.g., by the processing unit 150), and used to determine the amount of light impinging upon a given portion of the photosensor 130, such as one or more pixels. The amount of light impacting the various portions of the photosensor 130 may be used to identify the location where the annihilation photon interacted in the scintillator block 120. The total amount of light impacting the photosensor 130 may be used to determine the energy of the annihilation photon.

The scintillator block 120 is configured to receive the annihilation photons 104 emitted by the object 108 and to emit light photons 106 responsive to reception of the annihilation photons 104. It may be noted that a large number of light photons may be produced for each annihilation photon that impacts the scintillator block 120. It may also be noted that in the schematic depiction of FIG. 1 the scintillator block 120 is shown at a distance from the photosensor 130; however, the scintillator block 120 and photosensor 130 may be joined in various embodiments. Further, in some embodiments, a light guide may be provided. The light guide may be configured as a transparent interface between the scintillator block 120 (e.g., crystals of the scintillator block 120) and the photosensor 130, for example where the surface areas of the scintillator block 120 and the photosensor 130 are not the same. In the illustrated embodiment, the scintillator block 120 includes a reception surface 122 and an emission surface 124. The reception surface 122 is oriented toward the object 108, and the emission surface 124 is oriented toward the photosensor 130. Generally, in various embodiments, a ray (e.g., annihilation photon) impacts the reception surface 122, and enters the scintillator block 120. After traveling a distance in the scintillator block 120, the annihilation photon interacts with the scintillator 220 producing a large number of light photons. A portion of these light photons 160 are emitted from a corresponding portion of the emission surface 124 to the photosensor 130. It may be noted, as also discussed below, that the emission surface and reception surface of the scintillator block 120 may be oriented in different directions in various alternate embodiments (e.g., both the emission surface and the reception surface may be oriented upwards toward the object being imaged in some embodiments).

The photosensor 130 is configured to receive the light photons 106 from the scintillator block 120, and convert received light photons to electric charge. The light energy may be converted and collected by specific portions of the photosensor 130 that receive the energy (e.g., pixels), and the collected charge used to provide a measure of the rays received by the detector on a per pixel basis.

A top view of the scintillator block 120 is seen in the top center of FIG. 1. The depicted scintillator includes an array 160 of individual crystals 162. The scintillator block 120 includes a reflector member 169. The reflector member 169 covers all the surfaces of the array 160 excluding the emission surface 124, and is configured to reflect light generated by the crystals 162 directed from the sides of the array 160 back into the array 160. Thus, the light generated from the array 160 may be prevented from escaping from the sides of the array 160, increasing the proportion of the light created by the scintillation event that is emitted from the emission surface 124 toward the photosensor 130. In the illustrated embodiment, the scintillator block 120 is shown having a single array 160 for ease of illustration; however, it may be noted that plural arrays 160 may be assembled together to form the scintillator block 120 (with each array 160 surrounded by a corresponding reflector member 169 disposed around the sides of the array 160), for example to form a panel of the scintillator block 120. The depicted array 160 of crystals 162 is arranged in columns 166 and rows 168. In various embodiments, different numbers of columns and/or rows may be employed, or different arrangements of crystals may be employed.

As seen in the perspective view of an individual crystal 162 on the right hand side of FIG. 1, the depicted individual crystal 162 includes an upper surface 163 and a lower surface 164. The upper surface 163 and the lower surface 164 are disposed opposite of each other and are separated by sides. In the illustrated embodiment, the upper surface 163 is configured to form part of the reception surface 122 of the scintillator block 120, and the lower surface 164 is configured to form part of the emission surface 124 of the scintillator block 120. Thus, in the illustrated embodiment, the upper surface 163 is configured as a reception surface and the lower surface 164 is configured as an emission surface. It may be noted that other arrangements may be utilized in alternate embodiments. For example, a single surface (e.g., the upper surface 163) may be configured as both a reception surface and an emission surface. As another example, one or more of the sides extending between an upper and lower surface may be configured as a reception and/or emission surface. It should also be noted that the use of "upper" and "lower" surfaces herein is used for clarity and ease of description and illustration of opposed surfaces separated by sides, and is not intended to imply any specific orientation requirements. For example, a particular crystal or array may be rotated or otherwise position so that an "upper" surface points downward, or to a side.

The crystal 162 is configured to scintillate, or produce light energy responsive to rays (e.g., annihilation photons) received by the crystal 162. In the illustrated embodiment, the crystal 162 has four sides extending between the upper surface 163 and the lower surface 164, defining a generally rectangular cross-section. The crystal 162 includes a first side 170, a second side 172, a third side 174 (the third side 174 is disposed opposite the first side 170), and a fourth side 176 (the fourth side 176 is disposed opposite the second side 172). The crystal 162 may be made, as one example, of Silicate Yttrium Lutetium (LYSO), or, as another example, of Bismuth Germanate (BGO; $Bi_4Ge_3O_{12}$).

Generally, in various embodiments, at least one of the sides 170, 172, 174, 176 includes a roughened side surface, and at least one other side includes a smooth or polished side surface. Thus, in various embodiments, one side of a crystal in a scintillator crystal array has a different surface finish than a different side of the crystal, where one surface finish is relatively rougher, and the other surface finish is relatively smoother. As used herein, a roughened surface may have a cloudy visual appearance, while a polished surface may have a shiny visual appearance. As used herein, a roughened surface may have a RMS roughness of between about 150 nanometers to about 250 nanometers, an average roughness of about 120 nanometers to about 180 nanometers, and a Z range of about 1.0 to about 2.0 micrometers, where RMS roughness is the root mean square average of height deviations taken from the mean image data plane, average roughness is the arithmetic average of the absolute vales of the surface height deviations measured from the mean plane, and Z range is the maximum vertical distance between the highest and lowest data points in the image prior to the planefit. As used herein, a polished surface may have a RMS roughness of about 3 nanometers or lower, and average roughness of about 2 nanometers or lower, and a Z range of about 75 nanometers or lower. For example, a polished surface may have a RMS roughness of between about 0.5 and 2.5 nanometers.

As used herein, in various embodiments, roughened surfaces may be understood as including, for example, surfaces that have been finished using a lapping powder of about 5 microns or greater. For example, a roughened surface may be finished using a lapping powder of about 28 microns or greater in some embodiments. As additional examples, roughened surfaces in various embodiments may be formed using chemical etching (e.g., acid etching) or grinding.

As used herein, in various embodiments, polished surfaces may be understood as including surfaces that have been finished using a powder of about 3 microns or less. It may be noted that various embodiments need not necessarily be limited to the particular ranges disclosed herein, and that the particular types of finishes used herein are provided by way of example, and that other types of finishes (where at least one side of the crystal has a different finish than another side of the crystal) may be utilized in other embodiments. For example, in some embodiments, the distinction between a "roughened" and a "polished" surface may be made in terms of relative surface roughness. For example, in some embodiments, a roughened surface may be understood to have a RMS roughness that is substantially greater than the RMS roughness of a polished surface. By way of example, in various embodiments, a roughened finish may have a RMS roughness about 10 times, about 20 times, about 30 times, about 50 times, or about 100 times larger than the RMS roughness of a corresponding polished finish on the same crystal.

In the illustrated embodiment, first side 170 includes a roughened side surface 180, and the second side 172 includes a polished side surface 184. In FIG. 1, the roughened side surface 180 is depicted as covering only a portion of the first side 170. For example, the roughened side surface 180 may cover about one half of the first side 170. In other embodiments, the roughened side surface 180 may cover a larger or smaller proportion of the first side 170. For example, in some embodiments, the roughened side surface 180 may cover substantially the entire first side 170. As used herein, in some embodiments, a surface finish may be understood to substantially cover an entire side if the surface finish covers 95% or more of the side. In the illustrated embodiment, substantially the entire surface of the second side 172 is polished, and is covered by the polished side surface 184. Further, in the illustrated embodiment, the third side 174 and the fourth side 176 are also polished (not shown in FIG. 1). Thus, in the embodiment illustrated in FIG. 1, the sides 170, 172, 174, 176 define a rectangular cross section, with one side having a roughened side surface, and the remaining three sides having polished side surfaces. It may be noted that other arrangements of crystals may be utilized additionally or alternatively in various embodiments. For example, crystals having three sides extending between upper and lower surfaces to form a triangular cross section may be employed. Other cross-sections, such as polygons other than rectangles or triangles, may be utilized in other embodiments.

In various embodiments, only one (or a portion of one) of the sides 170, 172, 174, 176 may be roughened. Different orientations of the roughened side surfaces may be employed in different embodiments (see, for example, FIGS. 2 and 3 and related discussion). For example, in some embodiments, the single roughened sides may be oriented toward an interior of the array. As another example, in some embodiments, the single roughened sides may be oriented in a same direction. In some embodiments, the single roughened sides may be disposed adjacent to and oriented toward corresponding polished sides, while in other embodiments, the single roughened side of a given crystal may be disposed adjacent to and oriented toward a corresponding roughened side of an adjacent crystal.

Testing of example arrays have shown improved timing and/or light output from the use of arrays having mixtures of polished and roughened surfaces when compared to arrays having sides with similar finishes (e.g., all sides polished). In various embodiments, the amount of roughened surface or proportion of roughened surface relative to the total side surface or polished side surface (e.g., number of roughened sides and/or proportion of one or more sides covered by a roughened surface) may be controlled to improve the timing resolution of a detector. For example, the extent of roughness (e.g., RMS value), the coverage of roughness (e.g., number of sides and/or proportion of coverage of one or more sides), and the orientation of roughened surfaces may be varied to provide improved timing for a given array. In some embodiments, the extent of roughness, coverage of roughness, and/or orientation of roughened surfaces may be selected using experimental comparisons of timing responses for a given array configuration (e.g., number of rows and columns, crystal size, crystal material, crystal density).

Figure 2:
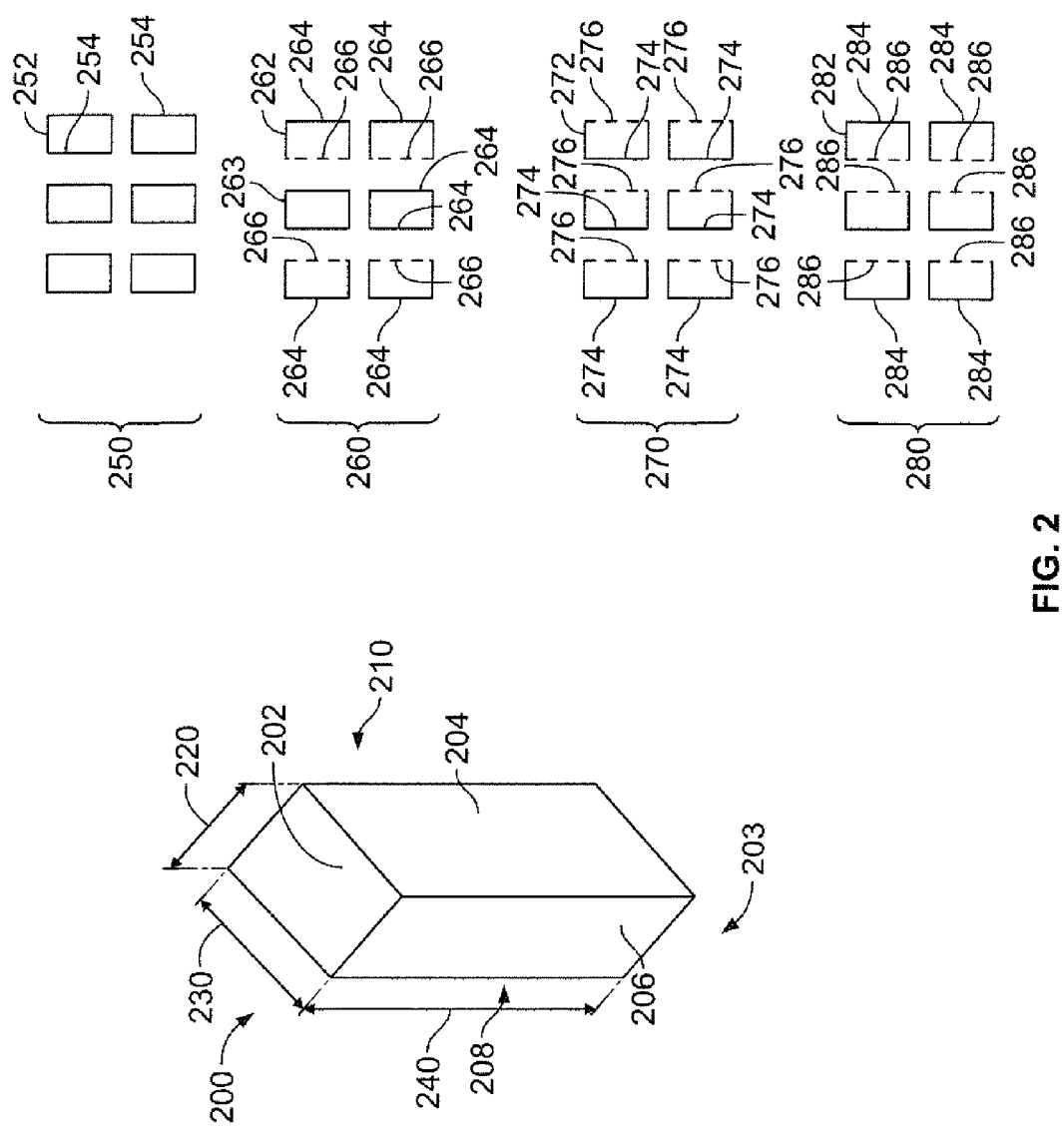
FIG. 2 illustrates example 2×3 crystal arrays in accordance with various embodiments.

For example, FIG. 2 illustrates example array configurations in accordance with various embodiments. The various arrays depicted in FIG. 2 are configured as 2×3 arrays. It may be noted that, in FIG. 2, gaps are shown between the sides of adjacent crystals in the array for ease of illustration. In some embodiments, air gaps of about 5 micrometers (μm) or less may be present when the array is assembled. In the depictions of arrays provided in FIG. 2, roughened surfaces are represented by a dashed line, and polished surfaces are represented by a solid line.

Each of the arrays depicted in FIG. 2 are formed from a group of crystals 200, with an example crystal 200 depicted on the left side of FIG. 2. The crystal 200 may be configured generally similarly to the crystal 162 depicted in FIG. 1. The crystal 200 includes an upper surface 202 disposed opposite a lower surface 203, with the upper surface 202 and lower surface 203 separated by sides 204, 206, 208, 210. In the illustrated embodiment of the example crystal 200, the surface of one of the sides is substantially entirely covered by a roughened surface, while the surfaces of the other three sides are substantially entirely covered by a polished surface.

The upper surface 202 defines a length 230 and a width 220. For example, the length 230 may about 5.3 millimeters and the width 220 may be about 4.0 millimeters. The sides define a height 240. For example, the height may be about 25 millimeters. In the illustrated examples, the roughened surfaces are selected from the sides bounded by the length 230 and the height 240. Thus, in the example embodiment, the roughened surfaces are about 5.3 millimeters by about 25 millimeters. In other embodiments, one or more dimensions may vary from the example values provided herein.

Four example arrays are depicted in FIG. 2. The array 250 is configured as a conventional array including crystals 252 having all polished sides 254. The remaining arrays included at least some crystals having one roughened side and three polished sides.

The array 260 includes crystals 262 having one roughened side 266 and three polished sides 264. The array 260 also includes crystals 263 having four polished sides 264. For the array 260 illustrated in FIG. 2, the crystals 262 are disposed on the edges (along the length of the array, where the array is 3 crystals long by 2 crystals wide) of the array 260, and the crystals 263 are disposed along the middle of the array 260. The roughened sides 266 are oriented toward the interior of the array.

The array 270 includes crystals 272 having one roughened side 276 and three polished sides 274. As seen in FIG. 2, the roughened sides 276 are oriented in a single direction (to the right as seen in FIG. 2). Thus, the roughened side 276 on the far right of the array 270 is oriented toward an exterior of the array 270 (e.g., toward a reflector (not shown in FIG. 2; see FIG. 1)).

The array 280 includes crystals 282 having one roughened side 286 and three polished sides 284. As seen in FIG. 2, the roughened sides 286 are oriented toward an interior of the array 280 (e.g., each roughened surface is adjacent to a crystal surface and not a reflector surface). Some of the roughened sides 286 are adjacent to a polished side 284, while other roughened sides 286 are adjacent to a roughened side 286 of an adjacent crystal 282 of the array 280.

For the example arrays depicted in FIG. 2, each array was combined with a monolithic Silicon photomultiplier (SiPM) to form a detector, and the timing response measured. The timing response of an array may be indicated by a timing resolution that is experimentally determined. Timing resolution, as used herein, may be understood as a statistical measure of the variance in timing differences between detectors. For example, two detectors (with each detector including a similarly configured crystal array to be tested coupled to a photosensor) may be disposed on nominally opposed sides of a source of annihilation photons, and the differences in the timing of the detection of coincidence pairs of annihilations measured. A number of coincidence events may be measured, and the variance of the timing differences analyzed to provide a timing resolution for the particular array used with the detector. The timing resolution may be stated, for example, as a full width half maximum (FWHM) of a distribution of timing differences between the two detectors.

For the example arrays depicted in FIG. 2, the timing response or timing resolution of the arrays having at least some crystals having one roughened side was observed to be improved relative to the timing response of the array 250 having all polished sides. For example, in one series of tests, the array 250 (all sides polished) was found to have a timing resolution of about 305 picoseconds. The array 260 (edge crystals having one side roughened, middle crystals having all sides polished) was found to have a timing resolution of about 273 picoseconds. Further, the array 270 (all crystals having one side roughened) was found to have a timing resolution of about 261 picoseconds, and the array 280 (all crystals having one side roughened) was found to have a timing resolution of about 262 picoseconds.

Thus, the timing resolution was seen to improve, relative to the array having all polished sides, by introducing crystals having one roughened side surface at the edges of the array. Further timing resolution improvement was seen by using crystals having one roughened surface for each crystal of the array. However, using all roughened surfaces did not provide timing improvement for tested arrays. It is believed that the use of a mixture of roughened and polished surfaces may help spread the scintillation light more optimally, which may result in the improved timing response.

Figure 3:
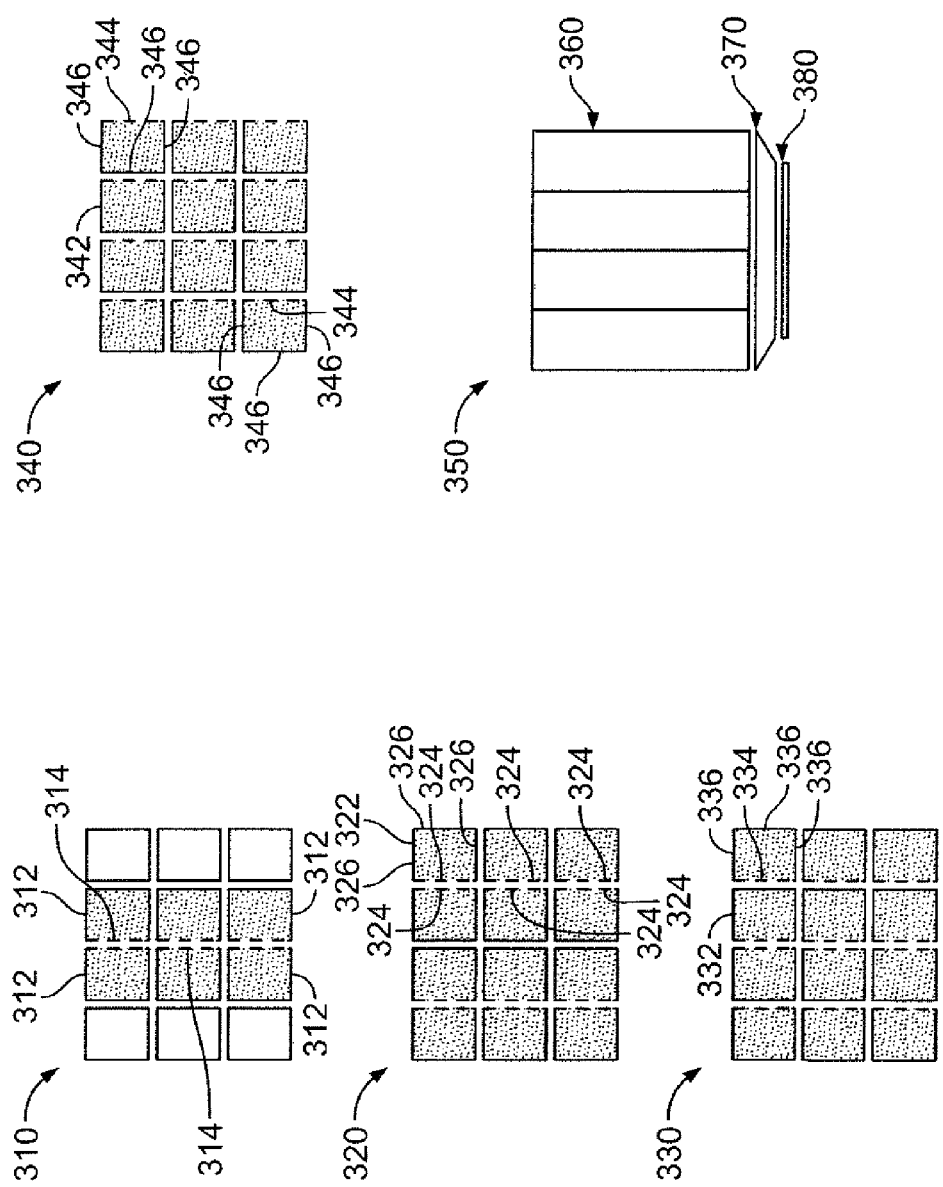
FIG. 3 illustrates example 3×4 crystal arrays in accordance with various embodiments.

FIG. 3 provides examples of arrays that are 4 crystals long by 3 crystals wide. As with FIG. 2, each roughened side is depicted with a dashed line and each polished side is depicted with a solid line.

The array 310 includes crystals 312 having one roughened side 314 in the middle (along the length) of the array 310, while the remaining arrays include crystals having one roughened side at each position of the array (e.g., having additional crystals having one roughened side at the edges of the array compared to the array 310).

For example, the array 320 includes crystals 322 each having one roughened side 324 and three polished sides 326. As seen in FIG. 3, each roughened side 324 is oriented toward and adjacent to a roughened side 324 of an adjacent crystal 322.

The array 330 includes crystals 332 each having one roughened side 334 and three polished sides 336. As seen in FIG. 3, each roughened side 334 is oriented toward an interior of the array 330. Some of the roughened sides 334 are oriented toward and adjacent to a roughened side 334 of an adjacent crystal 332, while others of the roughened sides 334 are oriented toward and adjacent to a polished side of an adjacent crystal.

The array 340 includes crystals 342 each having one roughened side 344 and three polished sides 346. As seen in FIG. 3, each roughened side 344 is oriented in the same direction (e.g., to the right of the array 330). Each of the roughened sides 334 is oriented toward and adjacent to a polished side of an adjacent crystal 332.

The example arrays of FIG. 3 were formed into detector blocks as seen on the right side of FIG. 3. The detector block 350 includes a crystal array 360, a light guide 370, and a silicon photomultiplier (SiPM) 380. The light guide 370 used to test the example arrays of FIG. 3 is about 2 millimeters thick, and the SiPM 380 was configured as a monolithic SiPM. The various arrays were tested using the same SiPM devices, with light output and timing response measured at the edges as well as the middle of the arrays. It was found that timing improvement was achieved for arrays for which each crystal had one roughened side (e.g., arrays 320, 330, 340) when compared to the array 310. Light output was also seen to have been improved for the arrays for which each crystal had one roughened side (e.g., arrays 320, 330, 340) when compared to the array 310. The improvements in light output and timing for the arrays 320, 330, and 340 were observed to be greater at the edges than for the overall arrays, further indicating the improvement in performance using a mixture of roughened and polished surfaces. Further, for the tested example arrays, the arrays 320 (roughened surfaces oriented toward each other) and 340 (roughened surfaces oriented in the same direction) were seen to have a slightly better timing response than the array 340; however, it may be noted that the differences in performance for the arrays having different orientations was substantially smaller than the differences from the array having fewer crystals including a roughened side (e.g., array 310). It may be noted that the example arrays discussed herein are provided by way of example. In various embodiments, other configurations may be utilized, and the relative performance of various orientations or various proportions of roughened surfaces compared to polished surfaces may vary with array configuration, crystal configuration, and/or choice of testing procedures.

Returning to FIG. 1, the depicted processing unit 150 is configured to receive information (e.g., signals) from multiple detectors 110, and to use the information to reconstruct an image. For example, the processing unit 150 may be configured to use the signal recorded for each pixel of the photosensor 130 to reconstruct an image.

Generally, in various embodiments, the processing unit 150 (and/or any sub-unit or module of the processing unit 150) may be understood as a processing circuitry unit and may include a memory as well as processing circuitry such as one or more field programmable gate array (FPGA), application specific integrated circuit (ASIC), integrated circuit (IC), or microprocessor.

In the illustrated embodiment, the processing module 150 is configured to read and record the signal measured in each pixel of the photosensor 130 following an exposure to light provided by the scintillator block 120. For example, each pixel may be configured to provide an output voltage representative of the amount of energy impacting that particular pixel. The recorded signals for each pixel may be used to reconstruct an image.

It should be noted that the arrangement of components in FIGS. 1-3 is provided by way of example for illustrative purposes, and that other arrangements may be employed in various embodiments. For example, different array configurations (e.g., numbers of columns and/or rows, orientation of roughened surfaces, shape or size of crystals) may be employed in other embodiments.

Figure 4:
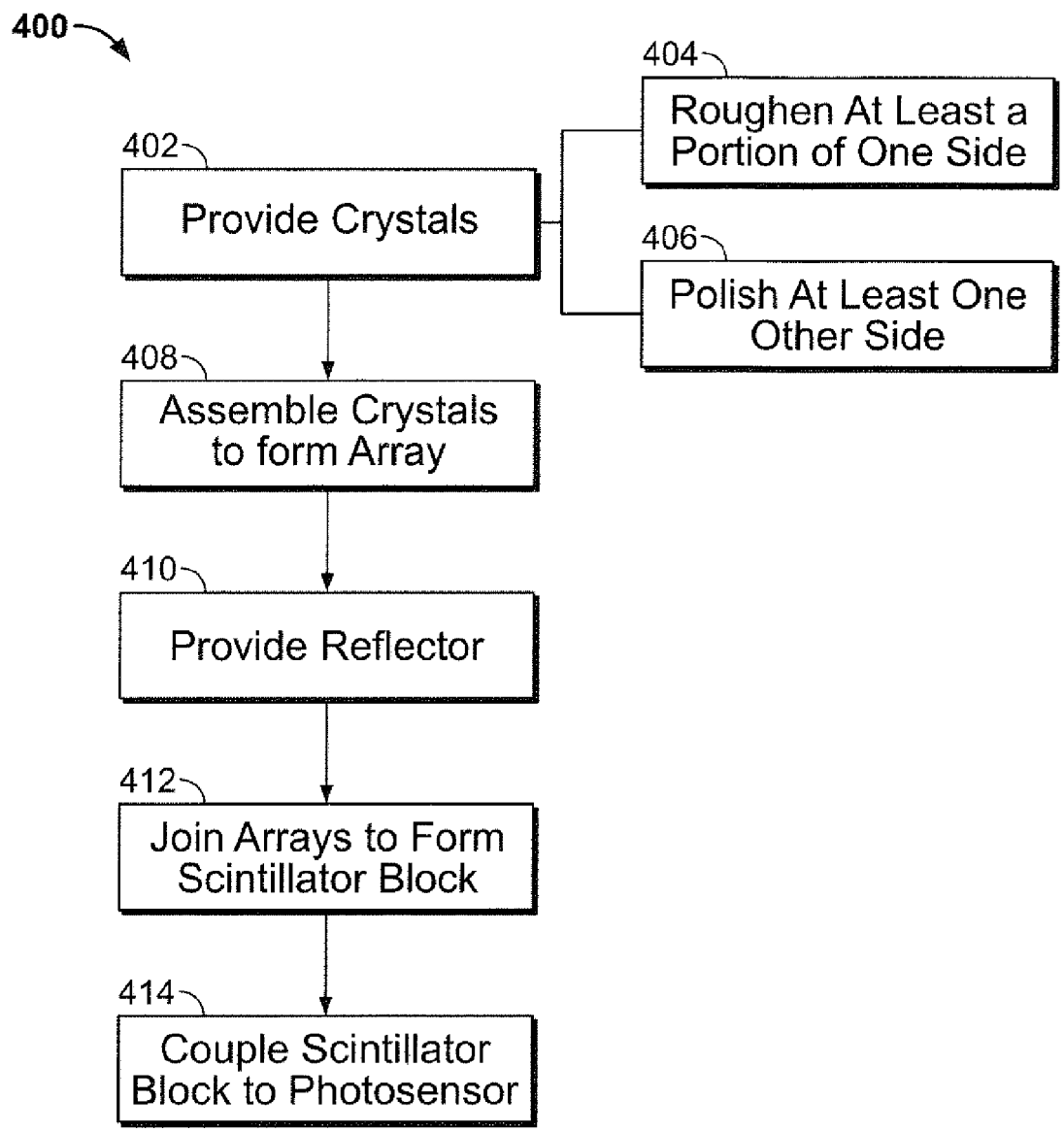
FIG. 4 is a flowchart of a method for forming a detector in accordance with various embodiments.

FIG. 4 provides a flowchart of a method 400 for forming a detector in accordance with various embodiments. The detector, for example, may be configured for use with a PET imaging system. In other embodiments, the detector may be configured for one or more other modalities of imaging additionally or alternatively. The method 400, for example, may employ, include, or related to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 402, crystals to be formed into an array are provided. The crystals each include an upper surface configured to receive rays from an object to be imaged and a lower surface disposed opposite the upper surface and configured to emit light energy responsive to the received rays. The crystals also include sides extending between the upper surface and the lower surface. At least one of the crystals includes a side including a roughened side surface, as well as at least one other side including a polished side surface. In some embodiments, each crystal includes a side having a roughened side surface, and at least one other side including a polished side surface. In some embodiments, the crystals include four sides and define a rectangular cross-section, with one side roughened and the other three sides polished. By way of example, the roughened and polished sides may be formed as discussed in connection with steps 404 and 406.

At 404, at least a portion of one side of a crystal is roughened. In some embodiments, substantially the entire side may be roughened. The side may be roughened using a lapping powder. In some embodiments, a lapping powder having a size greater than about 5 microns may be used to lap a surface. For example, a lapping powder of about 30 microns or greater may be used in various embodiments. In other embodiments, other finishing techniques may be used to provide a roughened surface as discussed herein.

At 406, at least one other side of the crystal is polished. The at least one other side that is polished, for example, may be disposed opposite of the side having at least a portion thereof roughened. In some embodiments, one side may include a roughened surface and each of the remaining sides may be polished. A polished surface may be provided, for example, using a powder of about 3 microns or less. In other embodiments, other finishing techniques may be used to provide a polished surface as discussed herein. For example, other techniques and or surface finish values than those described herein may be utilized to provide a first side having a first surface finish (e.g., roughened) and a second side having a different surface finish (e.g., polished).

At 408, the crystals are assembled to from a crystal array for a scintillator. For example, the crystals may be grouped into 2×3 arrays, or as another example, 3×4 arrays. In some embodiments, the particular orientation of the roughened surfaces may be provided in a predetermined orientation. For example, the roughened surfaces may be oriented in the same direction. As another example, the roughened surfaces may be oriented toward an interior of the array. As yet one more example, the roughened surfaces may be oriented such that each roughened surface is adjacent to and oriented toward a roughened surface of an adjacent crystal.

At 410, a reflector is provided. The reflector may surround the array along the sides (e.g., extending from a reception surface of the array to an emission surface of the array, and may cover the reception surface), and is configured to reflect light generated by the crystals of the array directed from the sides of the array back into the array. Thus, the light generated from the array May be prevented from escaping from the sides of the array (e.g., into neighboring arrays), increasing the proportion of light emitted from the emission surface of the array.

At 412, plural arrays are joined together to form a scintillator block. For example, a number of arrays formed at 410 may be arranged in a predetermined pattern to form a panel scintillator block.

At 414, the scintillator block is operably coupled to a photosensor (e.g., SiPM). The scintillator and photosensor are aligned so that the emission surface of the scintillator is oriented toward a surface of the photosensor configured to receive light energy. In various embodiments, the scintillator and the photosensor may define the same area, while in other embodiments the scintillator and the photosensor may define different areas. Further, the pixels of the photosensor and crystals of the scintillator may or may not align or match. In some embodiments, a light guide may be interposed between the scintillator and photosensor.

Figure 5:
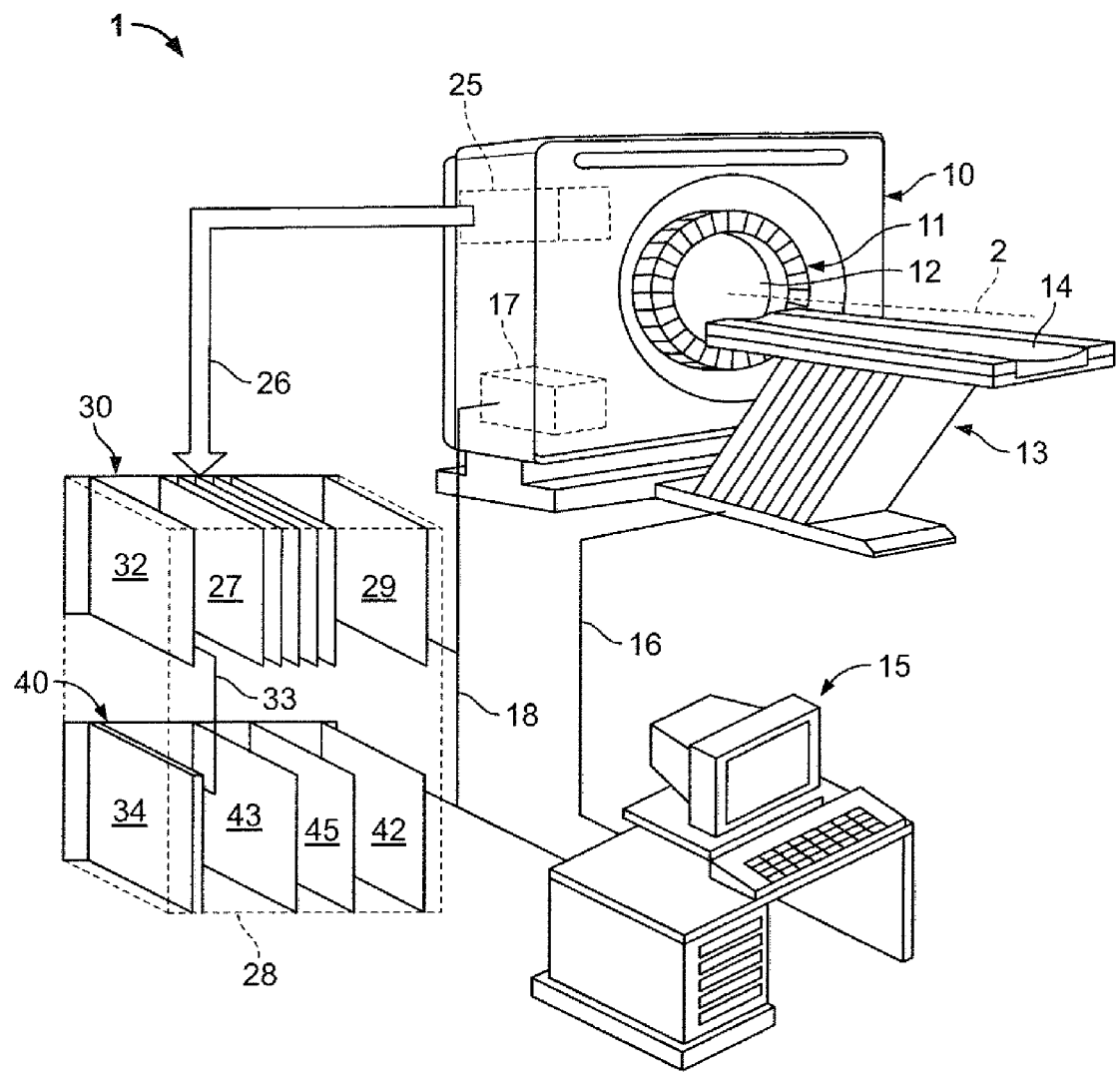
FIG. 5 illustrates an imaging system in accordance with various embodiments.
Figure 6:
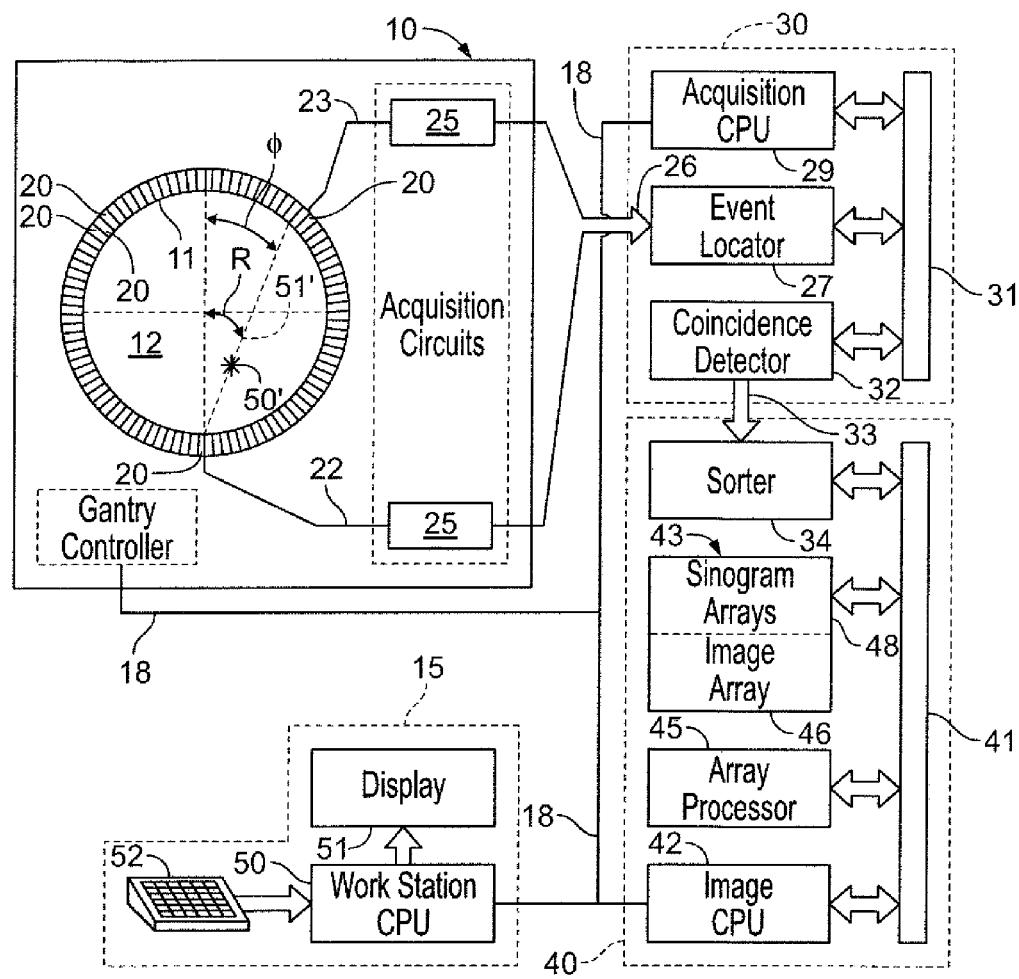
FIG. 6 is a schematic diagram of the imaging system of FIG. 5.
Figure 7:
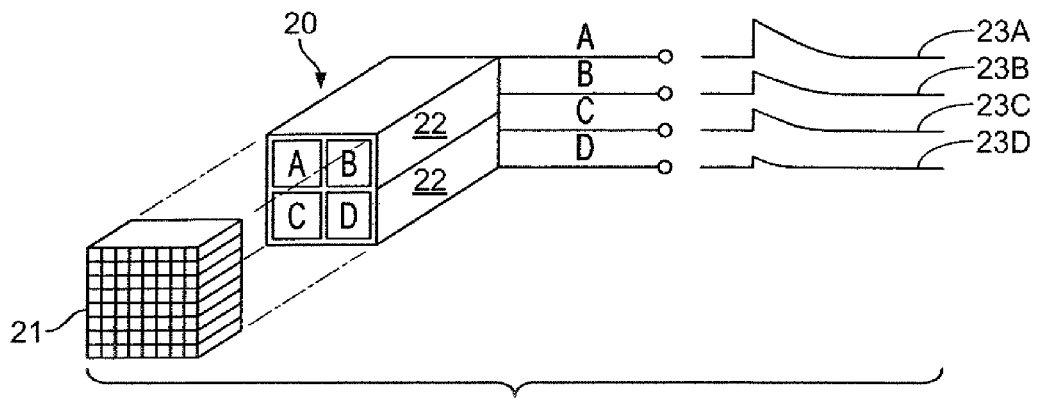
FIG. 7 illustrates an example of a detector module which forms part of the imaging system in accordance with various embodiments.

FIGS. 5-7 illustrate a PET imaging system with which various embodiments described herein may be employed. In other embodiments, crystal arrays as discussed herein may be utilized with other imaging systems (e.g., imaging systems configured for one or more additional or alternative modalities). FIG. 5 illustrates a PET scanning system 1 including a gantry 10 that supports a detector ring assembly 11 about a central opening or bore 12. The detector ring assembly 11 in the illustrated embodiments is generally circular and is made up of plural rings of detector 110 spaced along a central axis 2 to from a cylindrical detector ring assembly. In various embodiments, the detector ring assembly 11 may include 5 rings of detectors spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

As shown in FIG. 6, the operator work station 15 includes a central processing unit (CPU) 50, a display 51, and a keyboard 52. An operator may use the keyboard to control the calibration of the PET scanner, the configuration of the PET scanner, and the positioning of the patient table for a scan. Also, the operator may control the display of the resulting image on the display 51 and/or perform image enhancement functions using programs executed by the work station CPU 50.

The detector ring assembly 11 includes a number of detector modules. For example, the detector ring assembly 11 may include 36 detector modules, with each detector module including eight detector blocks. An example of one detector block 20 is shown in FIG. 7. The detector blocks 20 in a detector module may be arranged, for example, in a 2×4 configuration such that the circumference of the detector ring assembly 11 is 72 blocks around, and the width of the detector assembly 11 is 4 detector blocks wide. Each detector block 20 may include a number of individual detector crystals. In the illustrated embodiment, the array of detector crystals 21 is situated in front of four photosensors 22. The photosensors 22 are depicted schematically as photomultiplier tubes; however, it may be noted that SiPM's may be employed in various embodiments. Other configurations, sized and numbers of detector crystals, photosensors and detector modules may be employed in various embodiments.

During a PET scan, an annihilation photon may impact one of the detector crystals 21. The detector crystal 21, which may be formed, for example of lutetium yttrium silicate (LYSO) or bismuth germinate (BGO), for example, converts the annihilation photon into a number of photons which are received and detected by the photosensors. The photons generated by a detector crystal generally spread out to a certain extent and travel into adjacent detector crystals such that each of the four photosensors 22 receives a certain number photons as a result of an annihilation photon impacting a single detector crystal 21.

In response to a scintillation event, each photosensor 22 produces a signal 23A-23D on one of the lines A-D, as shown in FIG. 7, which rises sharply when a scintillation event occurs and then tails off exponentially. The relative magnitudes of the signals are determined by the position in the detector crystal array at which the scintillation event took place. The energy of the annihilation photon which caused the scintillation event determines the total magnitude of the four signals. The time that the signal begins to rise is determined by when the scintillation event occurs and the time required for photons to travel from the position of the scintillation event to the photosensors.

As shown in FIG. 6, a set of acquisition circuits 25 is mounted within the gantry 10 to receive the four signals from the detector block 20. The acquisition circuits 25 determine the event coordinates within the array of detector crystals using the relative signal strengths. The results are digitized and sent through a cable 26 to an event locator circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPT 29 which controls communications on the local area network 18 and a bus 31. The event locator circuits 27 assemble the information regarding each valid event into a set of digital numbers that indicated when the event took place and the identity of the detector crystal 21 which detected the event. The event locator circuits 27, for example, may use a detector position map to map a pair of coordinates to the detector 21 which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. For example, time markers in each event data packet may be required to be within a specified time period of each other, e.g., 6 nanoseconds. As another example, the locations indicated by the two event data packets may be required to lie on a straight line which passes through the field of view (FOV) of in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital number that precisely identify the locations of the two detector crystals 21 that detected the event.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction (θ) and pass through the scanner's field of view is a complete projection, or "view", which makes a set of sinogram. The distance (R) between a particular projection ray and the center of the field of view locates that projection ray within the view. As shown in FIG. 6, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the detector crystals 21 lying on the projection ray. During an emission scan, the coincidence counts are organized in memory 43, for example as a set of two-dimensional array, one for each axial image, and each having as one of its dimensions the projection angle θ and the other dimension the distance R. This θ by R map of the measured events may be referred to as sinogram array 48. The sorter 34 may also organize the coincidence events into other data formats. In a projection plane format, for example, other variables may be used to define coincidence events which are detected by pairs of detector crystals 21 in non-adjacent detector rings.

Coincidence events occur at random and the sorter 34 determines the θ and R values from the two crystal addresses in each coincidence data packet and increments the count of the corresponding sonogram array element. At the completion of the emission scan, the sinogram array 48 stores the total number of annihilation events which occurred along each ray. The array processor 45 reconstructs an image from the data in the sinogram array 48. First, however, a number of corrections may be made to the acquired data to correct for measurement errors such as those caused by attenuation of annihilation photons by the patient, detector gain non-uniformities, random coincidences, and integrator dead time. Each row of the corrected sinogram array is then Fourier transformed by the array processor 45 and multiplied by a one-dimensional filter array. The filtered data is then inverse Fourier transformed, and each array element is back projected to form the image array 46. The image CPU 42 may either store the image array data or output the data to the operator work station 15.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuitry capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A scintillator crystal array configured to receive rays emitted by an object to be imaged and to emit light energy responsive to the received rays, the scintillator crystal array comprising plural crystals, the crystal array having a width of at least four crystals, each crystal comprising:
   a reception surface configured to receive the rays emitted by the object to be imaged;
   an emission surface disposed opposite the reception surface and configured to emit the light energy responsive to the received rays; and
   plural sides extending between the reception surface and the emission surface, the plural sides comprising a roughened side and a polished side opposed to the roughened side, wherein the roughened side comprises a roughened side surface, the polished side comprises a polished side surface, and the roughened side surface is oriented toward an interior of the array relative to the polished side surface.

2. The scintillator crystal array of claim 1, wherein substantially entirely the roughened side is roughened and substantially entirely the polished side is polished.

3. The scintillator crystal array of claim 1, wherein the plural sides define a polygonal cross-section, wherein the roughened side comprising the roughened side surface comprises a single side and the remaining sides are polished sides.

4. The scintillator crystal array of claim 1, wherein the scintillator crystal array comprises crystals arranged in a M×N array, where M and N are each within a range between 4 and 10, the array configured to be joined with plural additional arrays to form a scintillator.

5. The scintillator crystal array of claim 1, wherein the roughened side surface has a RMS roughness between about 150 and 250 nanometers, and wherein the polished side surface has a RMS roughness less than about 3 nanometers.

6. The scintillator crystal array of claim 1, further comprising a reflector disposed around the sides of the scintillator crystal array and configured to reflect light directed from the sides of the scintillator crystal array back into the scintillator crystal array.

7. A detector system for imaging an object comprising:
   a scintillator block configured to receive rays from an object to be imaged and to emit light energy responsive to the received rays, the scintillator block including a scintillator crystal array configured to receive rays emitted by the object and to emit light energy responsive to the received rays, the scintillator crystal array comprising plural crystals, the scintillator crystal array having a width of at least four crystals, each crystal comprising:
   a reception surface configured to receive the rays emitted by the object;
   an emission surface disposed opposite the reception surface and configured to emit the light energy responsive to the received rays; and
   plural sides extending between the reception surface and the emission surface, the plural sides comprising a roughened side and a polished side opposed to the roughened side, wherein the roughened side comprises a roughened side surface, the polished side comprises a polished side surface, and the roughened side surface is oriented toward an interior of the array relative to the polished side surface; and
   a photosensor configured to receive the light energy emitted from the scintillator crystal array, the emission surfaces of the crystals oriented toward the photosensor.

8. The detector system of claim 7, wherein substantially entirely the roughened side is roughened and substantially entirely the polished side is polished.

9. The detector system of claim 7, wherein the plural sides define a polygonal cross-section, wherein the roughened side comprising the roughened side surface comprises a single side and the remaining sides are polished sides.

10. The detector system of claim 7, wherein the roughened side surface has a RMS roughness between about 150 and 250 nanometers, and wherein the polished side surface has a RMS roughness less than about 3 nanometers.

11. The detector system of claim 7, further comprising a reflector disposed around the sides of the array and configured to reflect light directed from the sides of the crystal array back into the scintillator crystal array.

12. A method for providing a scintillator for imaging an object, the method comprising:
    providing plural crystals, each crystal comprising:
        a reception surface configured to receive rays emitted by the object being imaged;
        an emission surface disposed opposite the reception surface and configured to emit light energy responsive the received rays; and
        plural sides extending between the reception surface and the emission surface, the plural sides comprising a roughened side and a polished side opposed to the roughened side, wherein the roughened side comprises a roughened side surface, and the polished side comprises a polished side surface;
    assembling the plural crystals to form a scintillator crystal array, wherein the crystal array has a width of at least four crystals, and the roughened side surface of each crystal is oriented toward an interior of the array relative to the polished side surface; and
    providing a reflector disposed around the sides of the scintillator crystal array, the reflector disposed around the sides of the crystal array and configured to reflect light directed from the sides of the scintillator crystal array back into the scintillator crystal array.

13. The method of claim 12, wherein the scintillator crystal array is joined with other scintillator crystal arrays to form the scintillator block.

* * * * *